United States Patent
Choi et al.

(10) Patent No.: US 7,527,419 B2
(45) Date of Patent: May 5, 2009

(54) BACKLIGHT ASSEMBLY INCLUDING A BUFFERED LAMP HOLDER FOR IMPACT ABSORPTION AND DISPLAY APPARATUS HAVING THE SAME

(75) Inventors: Seong-Sik Choi, Seoul (KR); Tae-Gil Kang, Suwon-si (KR); Seung-Chul Jeong, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 193 days.

(21) Appl. No.: 11/213,150

(22) Filed: Aug. 25, 2005

(65) Prior Publication Data
US 2006/0044839 A1   Mar. 2, 2006

(30) Foreign Application Priority Data
Aug. 27, 2004   (KR) .................. 10-2004-0067775
Jun. 10, 2005   (KR) .................. 10-2005-0049911

(51) Int. Cl.
*F21V 7/04* (2006.01)
(52) U.S. Cl. ...................... 362/634; 362/225
(58) Field of Classification Search ............ 362/30, 362/634, 369, 97, 29, 225, 390; 349/58, 349/60, 65, 67, 68, 70, 155
See application file for complete search history.

(56) References Cited

U.S. PATENT DOCUMENTS

| | | | | | |
|---|---|---|---|---|---|
| 5,558,420 | A | * | 9/1996 | Oki et al. | 362/634 |
| 5,788,356 | A | * | 8/1998 | Watai et al. | 362/621 |
| 6,309,081 | B1 | * | 10/2001 | Furihata | 362/634 |
| 6,409,356 | B1 | * | 6/2002 | Nishimura | 362/632 |
| 6,634,761 | B2 | * | 10/2003 | Ichikawa | 362/600 |
| 6,974,221 | B2 | * | 12/2005 | Wu et al. | 362/29 |
| 2002/0126237 | A1 | * | 9/2002 | Kasuga | 349/58 |
| 2003/0235052 | A1 | * | 12/2003 | Lee et al. | 362/329 |
| 2004/0047149 | A1 | * | 3/2004 | Amano et al. | 362/225 |
| 2004/0105269 | A1 | * | 6/2004 | Huang et al. | 362/369 |
| 2005/0057946 | A1 | * | 3/2005 | Kim | 362/561 |
| 2005/0105013 | A1 | * | 5/2005 | Nakagawa et al. | 349/58 |

\* cited by examiner

*Primary Examiner*—John A Ward
(74) *Attorney, Agent, or Firm*—Haynes and Boone LLP

(57) ABSTRACT

A backlight assembly includes a lamp, a light guide plate, a receiving container and a lamp holder. The lamp generates light. The light guide plate has a light incident face through which the light generated by the lamp enters the light guide plate. The light guide plate guides the light. The receiving container has a base plate and sidewalls protruding from the edge portions of the base plate to define a receiving space for receiving the lamp and the light guide plate. The lamp holder holds an end portion of the lamp and includes a buffer portion. When an impact is applied to the backlight assembly, the buffer portion absorbs the impact to prevent damages to the lamp and the light guide plate.

20 Claims, 13 Drawing Sheets

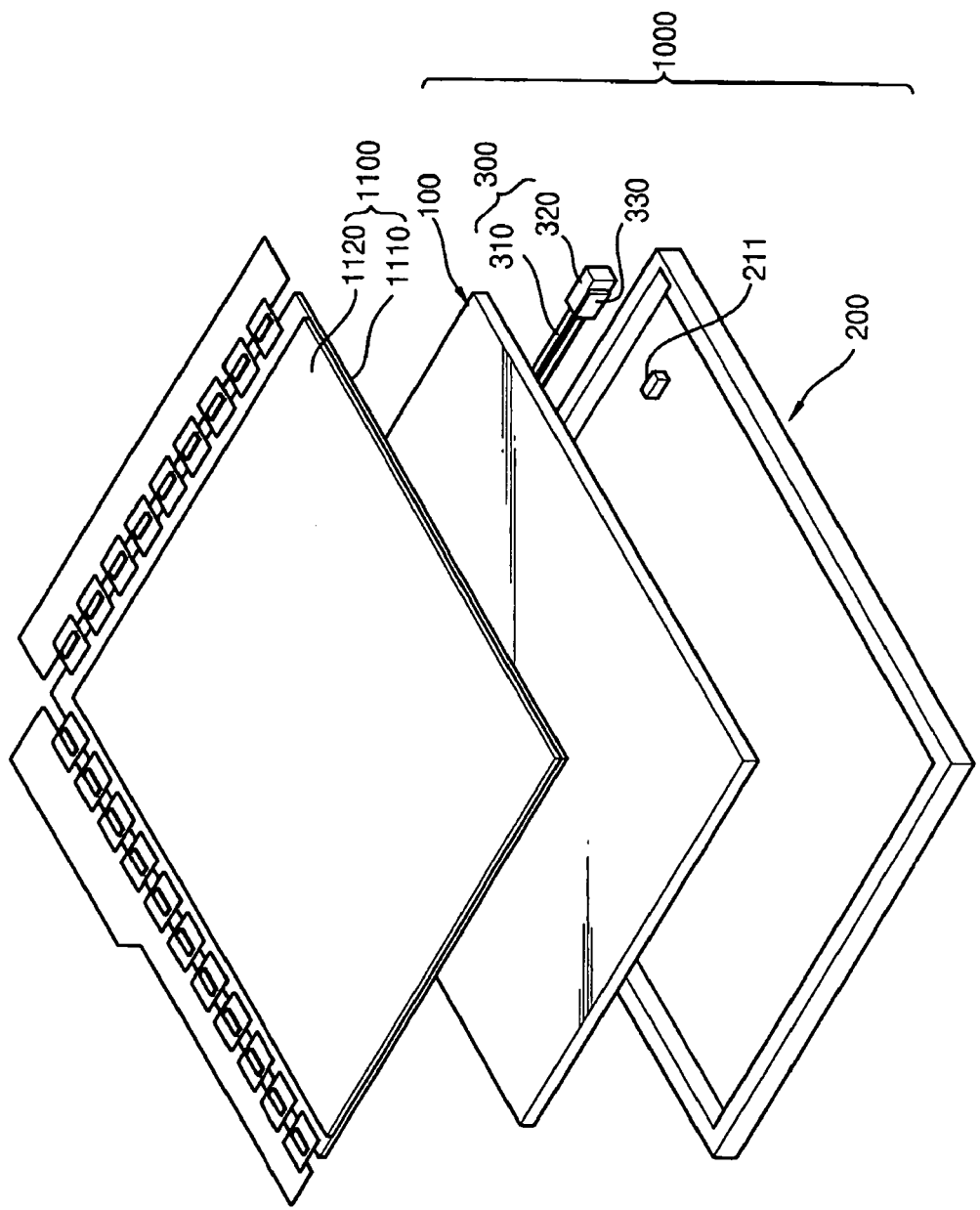

BACKLIGHT ASSEMBLY INCLUDING A BUFFERED LAMP HOLDER FOR IMPACT ABSORPTION AND DISPLAY APPARATUS HAVING THE SAME

CROSS REFERENCE TO RELATED APPLICATIONS

This application relies for priority upon Korean Patent Application No. 2004-67775 filed on Aug. 27, 2004, and Korean Patent Application No. 2005-49911 filed on Jun. 10, 2005, the contents of which are herein incorporated by reference in their entireties.

BACKGROUND OF THE INVENTION

1. Field of the Invention

The present invention relates to a backlight assembly and display apparatus having the backlight assembly. More particularly, the present invention relates to a backlight assembly having enhanced reliability and a display apparatus having the backlight assembly.

2. Description of the Related Art

A display apparatus converts an electric signal that is processed by an information processing apparatus into an image. Examples of display apparatus include a cathode ray tube (CRT) apparatus, a liquid crystal display (LCD) apparatus, an organic light emitting display (OLED) apparatus, etc.

Of the different types of display apparatuses, the LCD apparatus typically includes a display panel and a backlight assembly. The display panel displays an image by controlling the optical transmittance of liquid crystals through a pixel. The backlight assembly provides the display panel with light.

The backlight assembly includes a lamp unit and a light guide plate. The lamp unit includes a lamp that generates light and a lamp holder that supports the lamp. The light guide plate enhances the luminance uniformity of the light generated by the lamp and directs the light toward the display panel.

A receiving container receives the lamp unit and the light guide plate. When the distance between the lamp unit and the light guide plate increases, the thickness of the backlight assembly increases. When the distance between the lamp unit and the light guide plate is decreased in order to reduce the thickness of the backlight assembly, the lamp unit and the light guide plate are easily damaged by an impact applied to at least one of the lamp unit and the light guide plate. Thus, there is a conflict between compactness of the device and the reliability of the device.

A method of making the display device compact without compromising reliability is desired.

SUMMARY OF THE INVENTION

The present invention provides a backlight assembly capable of preventing the floating of a light guide plate in order to reduce an impact applied to a lamp unit and/or the light guide plate.

The present invention also provides a display apparatus having the above backlight assembly.

In an exemplary backlight assembly according to the present invention, the backlight assembly includes a lamp, a light guide plate, a receiving container and a lamp holder. The lamp generates light. The light guide plate has a light incident face through which the light generated by the lamp enters the light guide plate. The light guide plate guides the light. The receiving container has a base plate and sidewalls protruding from edge portions of the base plate to define a receiving space for receiving the lamp and the light guide plate. The lamp holder holds an end portion of the lamp. The lamp holder includes a buffer portion that moderates an impact due to a floating of the light guide plate.

The portion of the lamp holder that is adjacent to the light incident face of the light guide plate may protrude toward the light incident face of the light guide plate to form the buffer portion. The receiving container may also include a light guiding plate (LGP) fixing member protruding from the base plate to be disposed between the light incident face of the light guide plate and the buffer portion of the lamp holder.

Preferably, the lamp holder includes a first buffer opening for absorbing any impact applied to the light guide plate and the receiving container.

In another aspect, the present invention is a display apparatus that includes a backlight assembly and a display panel. The backlight assembly includes a lamp, a light guide plate, a receiving container and a lamp holder. The lamp generates light, and the light guide plate guides the light. The light guide plate has a light incident face through which the light generated by the lamp enters the light guide plate. The receiving container has a base plate and sidewalls protruding from edge portions of the base plate to define a receiving space for receiving the lamp and the light guide plate. The lamp holder holds an end portion of the lamp. The lamp holder includes a buffer portion that absorbs an impact due to the floating of the light guide plate. The display panel is disposed over the backlight assembly. The display panel converts the light generated by the lamp of the backlight assembly into an image.

According to the present invention, when an impact is applied to the backlight assembly or the display apparatus, the LGP fixing member fastens the light guide plate to the receiving container and the buffer portions absorb the impact to prevent damages to the lamp and the light guide plate.

BRIEF DESCRIPTION OF THE DRAWINGS

The above and other features and advantages of the present invention will become more apparent by describing in detailed exemplary embodiments thereof with reference to the accompanying drawings, in which:

FIG. 20 is an exploded perspective view illustrating a display apparatus according to an exemplary embodiment of the present invention.

DESCRIPTION OF THE EMBODIMENTS

It should be understood that the exemplary embodiments of the present invention described below may be modified in many different ways without departing from the inventive principles disclosed herein, and the scope of the present invention is therefore not limited to these particular flowing embodiments. Rather, these embodiments are provided so that this disclosure will be thorough and complete, and will fully convey the concept of the invention to those skilled in the art by way of example and not of limitation.

Hereinafter, the embodiments of the present invention will be described in detail with reference to the accompanying drawings.

Figure 1:
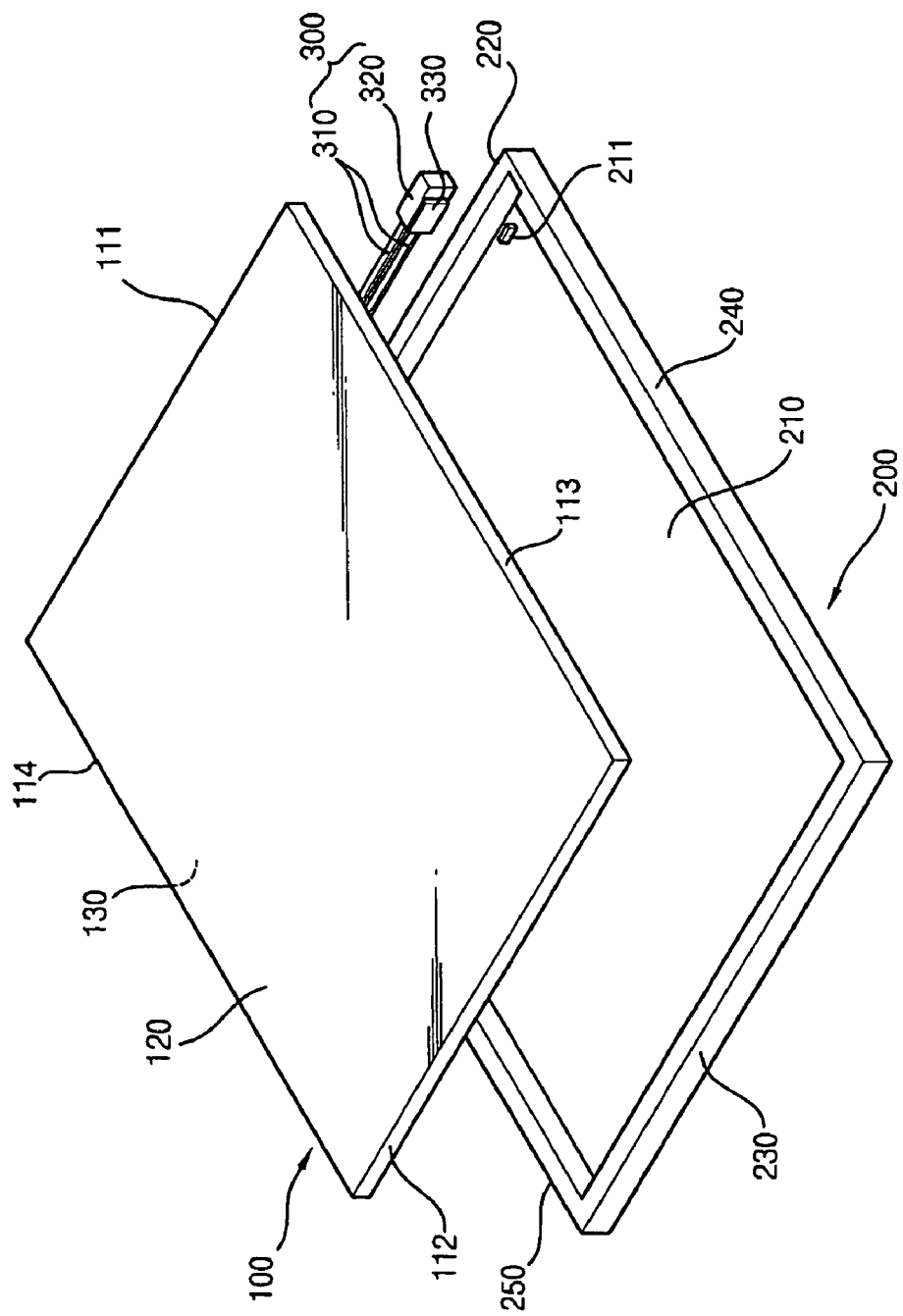
FIG. 1 is an exploded perspective view illustrating a backlight assembly according to a first exemplary embodiment of the present invention.

FIG. 1 is an exploded perspective view illustrating a backlight assembly according to a first exemplary embodiment of the present invention.

Referring to FIG. 1, a backlight assembly according to the present embodiment includes a light guide plate 100, a receiving container 200 and a lamp unit 300.

The light guide plate 100 is shaped like a rectangular plate. The light guide plate 100 includes, for example, an optically transparent acrylic resin. The light guide plate 100 includes a first side face 111, a second side face 112, a third side face 113, a fourth side face 114, a light exiting face 120, and a light reflecting face 130 that is opposite the light exiting face 120. The first, second, third and fourth side faces 111, 112, 113 and 114 connect the light exiting face 120 and the light reflecting face 130.

The first side face 111 is substantially parallel to the second side face 112, and the third side face 113 is substantially parallel to the fourth side face 114. The first side face 111 is connected to the second and fourth side faces 112 and 114, and the second side face 112 is also connected to the third and fourth side faces 113 and 114. The first side face 111 is a light incident face. In other words, the lamp unit 300 is adjacent to the first side face 111 so that the light generated by the lamp unit 300 enters the light guide plate 100 through the first side face 111.

The light guide plate 100 may be, for example, shaped like a rectangular plate and have a substantially uniform thickness. Alternatively, the light guide plate 100 may have a wedge-shape with its thickness decreasing from the first side face 111 to the second side face 112.

The light exiting face 120 is opposite the light reflecting face 130. Light that enters the light guide plate 100 through the first side face 111 exits the light guide plate 100 through the light reflecting face 130. The light reflecting face 130 reflects a portion of the light that enters the light guide plate 100 through the first side face 111 toward the light exiting face 120.

A plurality of prism patterns (not shown) may be formed on the light exiting face 120 or the light reflecting face 130 in order to alter the path of light that enters the light guide plate 100 through the first side face 111. When protrusions or recesses are formed at the first, second, third and fourth side faces 111, 112, 113 and 114, the luminance and the luminance uniformity are lowered. Therefore, it is preferable that there be no protrusions or recesses on the side faces 111, 112, 113, 114.

The receiving container 200 includes a base plate 210, a first sidewall 220, a second sidewall 230, a third sidewall 240 and a fourth sidewall 250. The first to fourth sidewalls 220, 230, 240 and 250 extend from edge portions of the base plate 210. The receiving container 200 receives the light guide plate 100 and the lamp unit 300.

The base plate 210 has a rectangular shape to receive the light guide plate 100. The base plate 210 may have as many openings (not shown) as possible leaving an area supporting the light guide plate 100 without an opening, thereby reducing weight. The receiving container 200 further includes a light guiding plate (LGP)-fixing member 211. The LGP-fixing member 211 protrudes from the base plate 210. The LGP-fixing member 211 is disposed at a region where the first side face 111 meets an end portion of the lamp unit 300. The LGP-fixing member 211 will be explained in detail with reference to FIG. 5.

The lamp unit 300 includes at least one lamp 310 generating light, and a lamp holder 320. The lamp unit 310 is disposed between the first side face 111 of the light guide plate 100 and the first sidewall 220 of the receiving container 200.

A cold cathode fluorescent lamp (CCFL) having a cylindrical shape may be employed as the lamp 310. A hot electrode (not shown) for applying a relatively high voltage, and a cold electrode (not shown) for applying a relatively low voltage are disposed at first and second end portions of the lamp 310, respectively. The lamp unit 300 may include more than one lamp 310.

The lamp holder 320 receives an end portion of the lamp 310 to protect the lamp 310 and fastens the lamp 310 to the receiving container 200. The lamp holder 320 includes a buffer portion 330. The buffer portion 330 protrudes toward the first side face 111 of the light guide plate 100. The buffer portion 330 absorbs any impact applied by the lamp holder 320, which is caused by the floating of the light guide plate 100, so that damages to the light guide plate 100 and the lamp 310 are prevented.

The lamp unit 300 may further include a lamp cover (not shown). The lamp cover protects the lamp 310. The lamp cover includes a material having a relatively high optical reflectivity. In some embodiments, a material of high optical reflectivity may be coated on a surface of the lamp cover to reflect the light generated by the lamp 310 toward the first side face 111 of the light guide plate 100. Therefore, light-using efficiency is enhanced.

Figure 2:
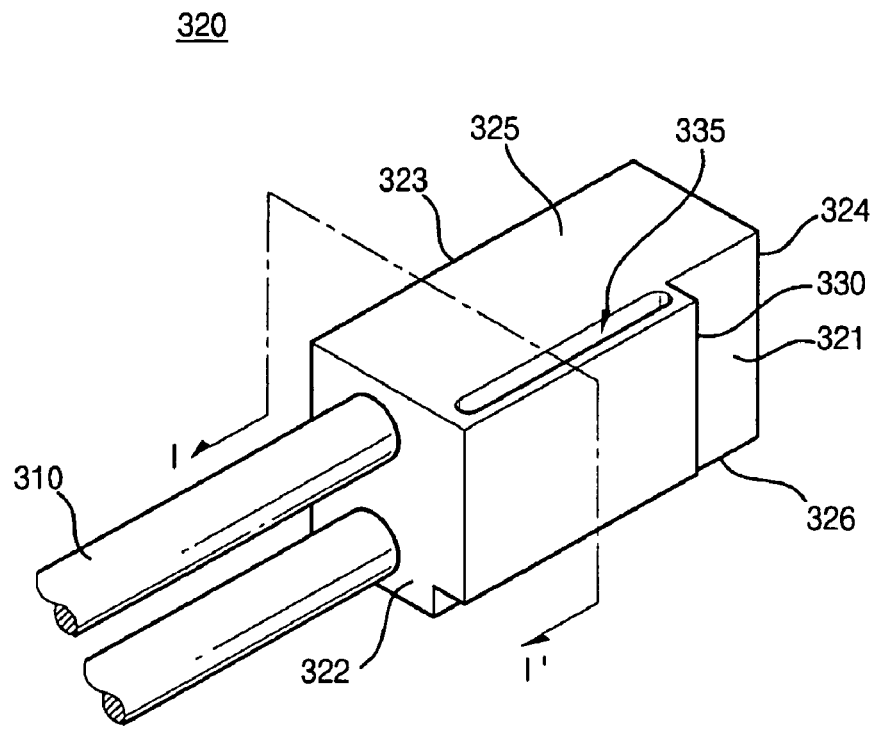
FIG. 2 is a perspective view illustrating a lamp holder in FIG. 1.
Figure 3:
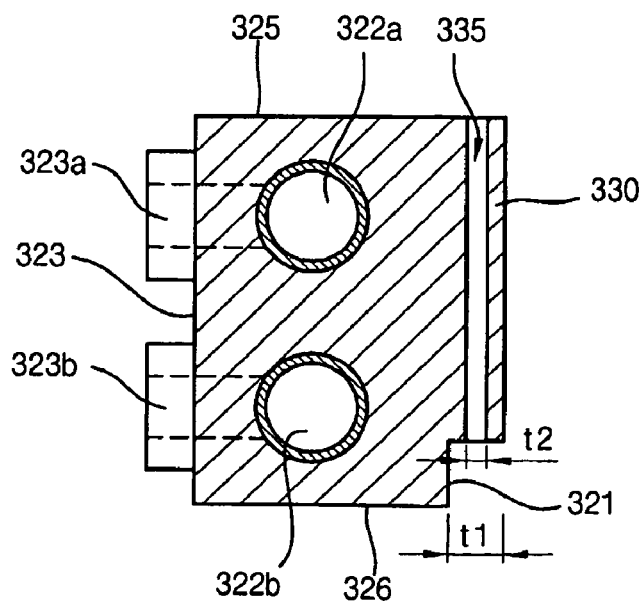
FIG. 3 is a cross-sectional view taken along a line I-I' in FIG. 2.

FIG. 2 is a perspective view illustrating a lamp holder of FIG. 1, and FIG. 3 is a cross-sectional view taken along a line I-I' in FIG. 2.

Referring to FIGS. 2 and 3, the lamp holder 320 includes a body having a rectangular parallelepiped shape and the buffer portion 330. The body has a first face 321, a second face 322, a third face 323, a fourth face 324, a fifth face 325 and a sixth face 326. The buffer portion 330 is formed at the first face 321.

The buffer portion 330 protrudes from the first face 321 toward the first side face 111 of the light guide plate 100 by a thickness t1. The buffer portion 330 absorbs the impact applied to the light guide plate 100 or the lamp holder 320, reducing the damages to the light guide plate 100 and the lamp holder 320.

The buffer portion 330 includes a buffer opening 335. A portion of the buffer portion 330 is removed to form the buffer opening 335. The buffer opening 335 has a width t2 that is smaller than the thickness t1 of the buffer portion 330.

The buffering opening 335 provides the buffer portion 330 with a space for compression to absorb the impact applied to the lamp holder 320.

The lamp holder 320 formed on the second face 322 further includes a first hole 322a and a second hole 322b for receiving the lamp(s) 310. The first hole 322a and the second hole 322b are formed on the second face 322 of the lamp holder 320. The lamp holder 320 further includes a third hole 323a and a fourth hole 323b formed at the third face 323 facing the first face 321. The third hole 323a and the fourth hole 323b are connected to the first hole 322a and the second hole 322b, respectively. Wires for applying a driving voltage to the lamp 310 are disposed in the third hole 323a and the fourth hole 323b.

Figure 4:
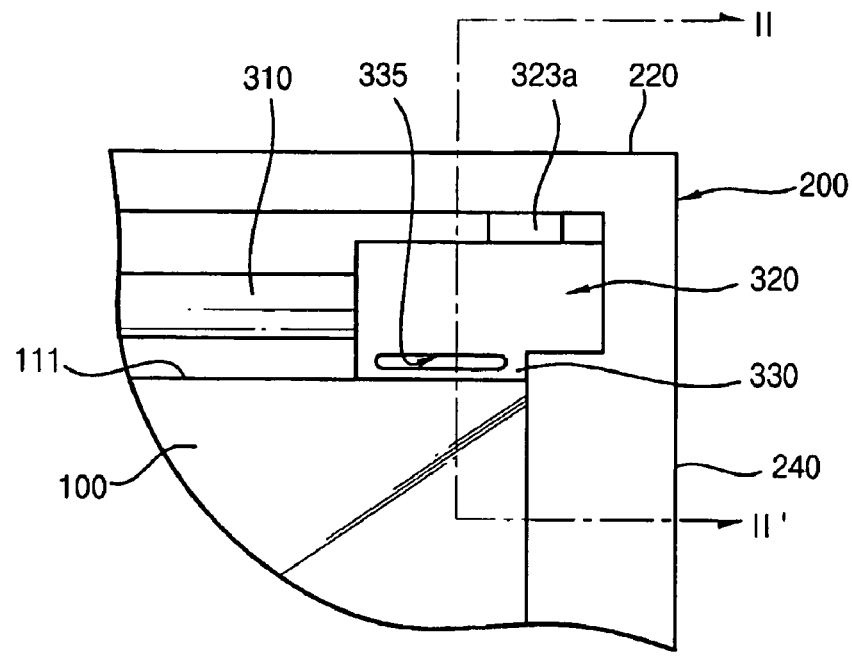
FIG. 4 is a plan view illustrating a portion of the receiving container combined with a lamp unit in FIG. 2.
Figure 5:
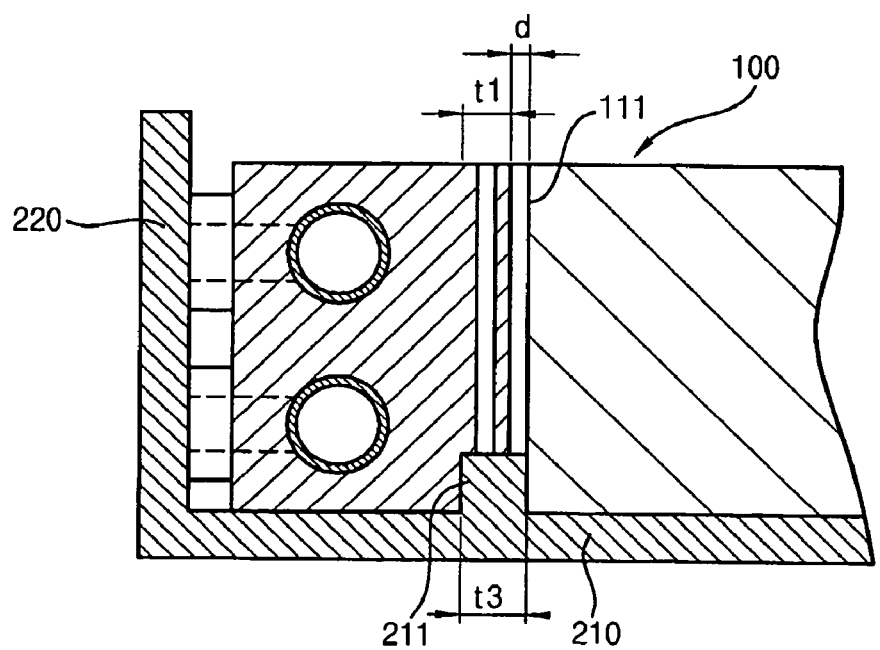
FIG. 5 is a cross-sectional view taken along a line II-II' in FIG. 4.

FIG. 4 is a plan view illustrating a portion of the receiving container combined with a lamp unit in FIG. 2, and FIG. 5 is a cross-sectional view taken along a line II-II' in FIG. 4.

Referring to FIGS. 4 and 5, the LPG-fixing member 211 protrudes from the base plate 210 of the receiving container 200 to be disposed between the first face 111 of the light guide plate 100 and the buffer portion 330 of the lamp holder 320. The LPG-fixing member 211 makes contact with the buffer portion 330. The LPG-fixing member 211 has a width of t3 that is greater than the thickness t1 of the buffer portion 330.

Therefore, when the receiving container 200 receives the light guide plate 100, the first face 111 of the light guide plate 110 makes contact with the LGP-fixing member 211, and the first face 111 of the light guide plate 110 is spaced apart from the buffer portion 330 of the lamp holder 320 by a distance d. The distance d corresponds to a difference between the width t3 of the LGP-fixing member 211 and the thickness t1 of the buffer portion 330. The distance d is, for example, in a range of about 0.05 mm to about 0.1 mm.

When impact is applied to the backlight assembly, the LGP-fixing member 211 fastens the light guide plate 100 to the receiving container 200, and even when excessive impulse is applied to the backlight assembly, the buffer opening 335 absorbs the impact to reduce damages to the lamp unit 300 and the light guide plate 100.

The third hole 323a and the fourth hole 323b, where the wirings for applying the driving voltage to the lamp 100 are disposed, absorb the impact applied by the first sidewall 220 of the receiving container 200.

Figure 6:
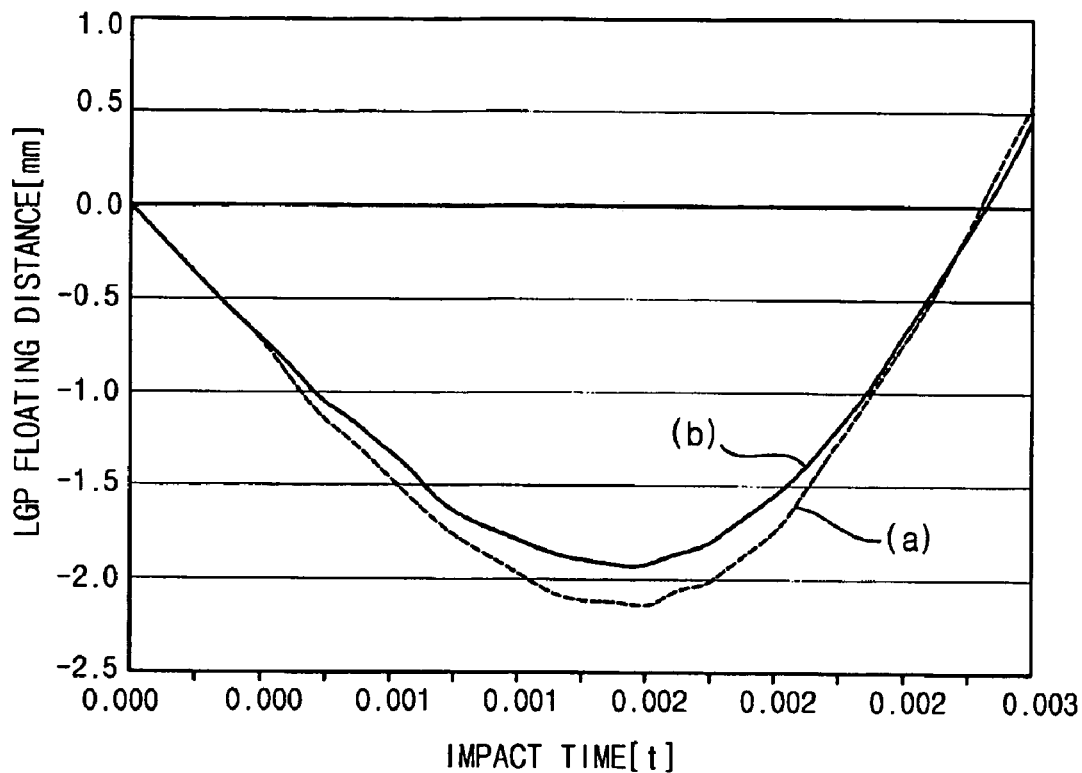
FIG. 6 is a graph showing a relationship between impact time and an LGP floating distance of the backlight assembly in FIG. 1.

FIG. 6 is a graph showing the relationship between impact time and an LGP floating distance of the backlight assembly in FIG. 1. "Impact time" is measured from the moment an impact is applied to the backlight assembly.

In order to measure the LGP floating distance, an LGP floating distance measuring device (not shown) was disposed at the first side face 111 of the light guide plate 100.

Referring to FIG. 6, a graph (a) corresponds to an LGP floating distance of a light guide plate in a conventional backlight assembly, and a graph (b) corresponds to an LGP floating distance of the light guide plate in the backlight assembly of FIGS. 1 through 5.

According to the graph (a), the maximum LGP floating distance of the conventional backlight assembly is about 2.14 mm, whereas, according to the graph (b), a maximum LGP floating distance of the backlight assembly according to the present embodiment is about 1.92 mm. As a result, the maximum LGP floating distance of the backlight assembly according to the present embodiment is reduced by about 10.3% with reference to the maximum LGP floating distance of the conventional backlight assembly.

Figure 7:
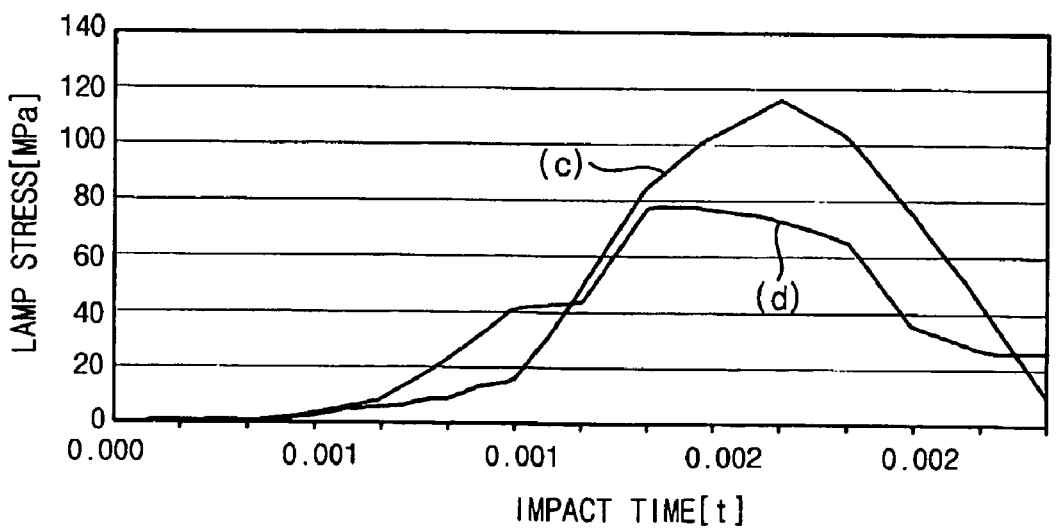
FIG. 7 is a graph showing a relationship between impact time and an LGP lamp stress of the backlight assembly in FIG. 1.

FIG. 7 is a graph showing a relationship between impact time and an LGP lamp stress of the backlight assembly in FIG. 1.

Referring to FIG. 7, a graph (c) corresponds to the lamp stress experienced by a light guide plate in the conventional backlight assembly, and a graph (d) corresponds to the lamp stress experienced by the light guide plate in the backlight assembly in FIGS. 1 through 5.

According to graph (c), the maximum lamp stress of the conventional backlight assembly in response to an impact is about 117 Mpa. In comparison, according to the graph (d), the maximum lamp stress of the backlight assembly according to the present embodiment is about 78 Mpa. These results indicate that the maximum lamp stress of the backlight assembly according to the present embodiment is reduced by about 33% relative to the maximum lamp stress of the conventional backlight assembly.

As shown in FIGS. 6 and 7, the backlight assembly according to the present embodiment has reduced LGP floating distance and lamp stress, so that damages to the lamp and the receiving container are reduced or even prevented.

Figure 8:
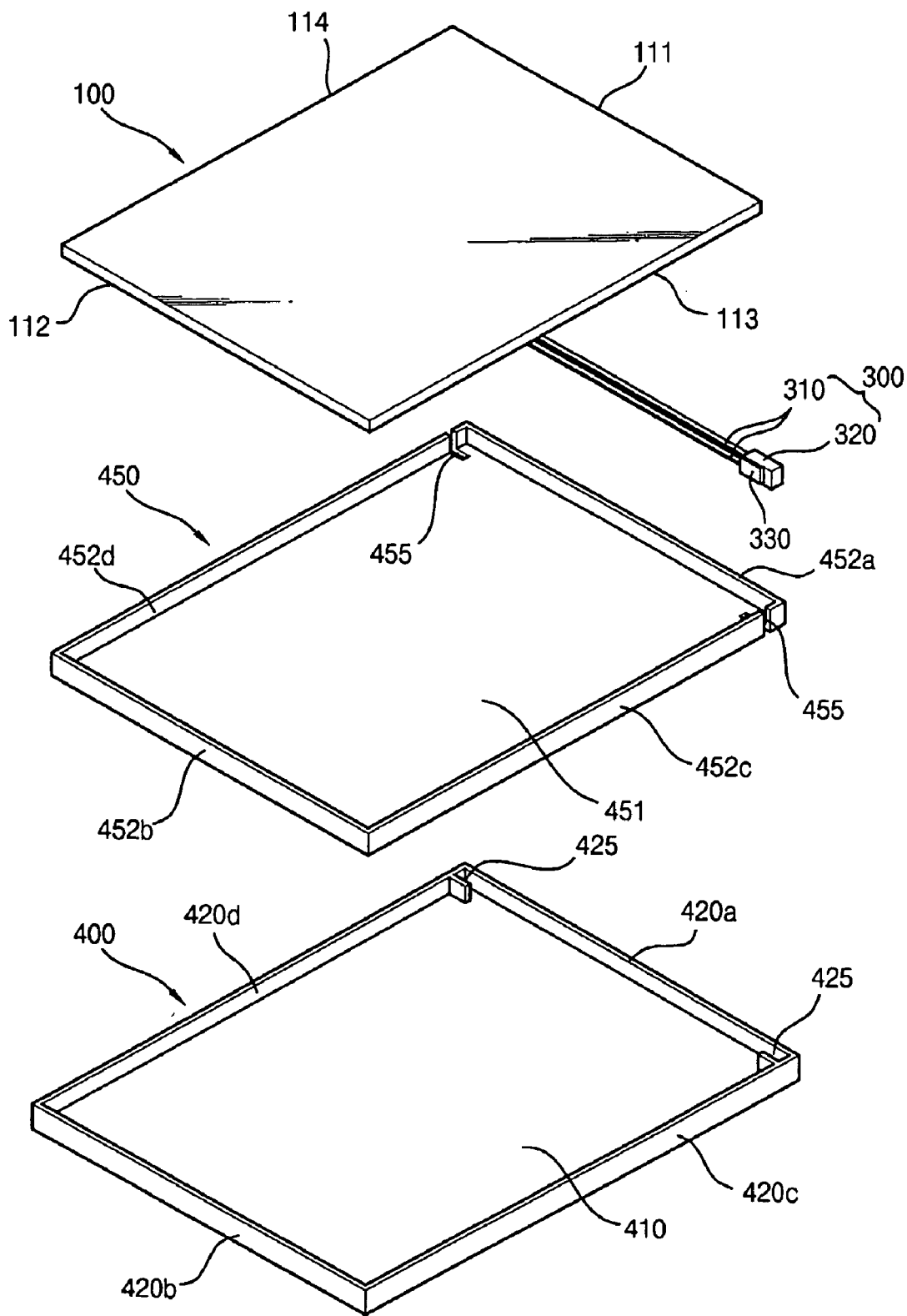
FIG. 8 is an exploded perspective view illustrating a backlight assembly according to a second exemplary embodiment of the present invention.
Figure 9:
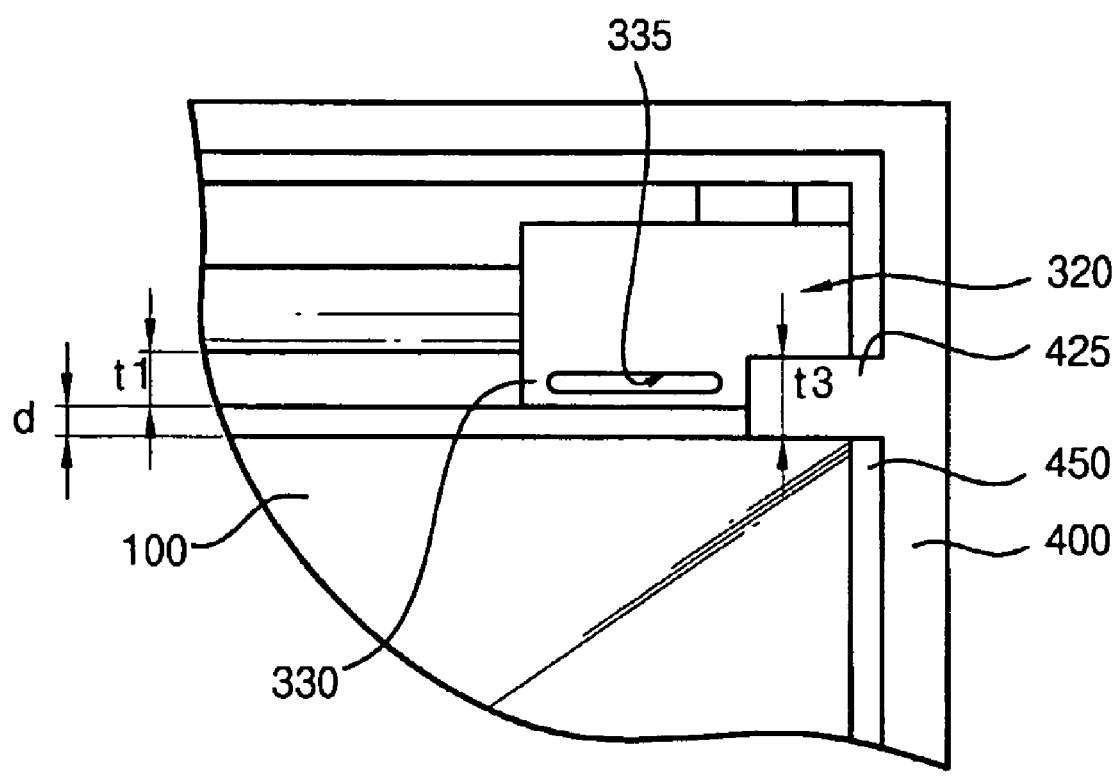
FIG. 9 is a plan view illustrating a portion of the receiving container combined with a lamp unit in FIG. 8.

FIG. 8 is an exploded perspective view illustrating a backlight assembly according to a second exemplary embodiment of the present invention, and FIG. 9 is a plan view illustrating a portion of the receiving container combined with a lamp unit in FIG. 8.

The backlight assembly as shown in FIG. 8 is substantially the same as the backlight assembly as shown in FIGS. 1 to 5, except for a first receiving container 400 and a second receiving container 450. Thus, the same reference numerals will be used to refer to the same or like parts as those described in the first exemplary embodiment and any further explanation concerning the already-described elements will be omitted.

Referring to FIGS. 8 and 9, the backlight assembly according to the second exemplary embodiment includes a first receiving container 400 and a second receiving container 450.

The first receiving container 400 includes a first base plate 410 and a first frame portion protruding from edge portions of the first base plate 410. The first receiving container 400 receives the second receiving container 450.

The first frame portion includes a first sidewall 420a, a second sidewall 420b, a third sidewall 420c and a fourth sidewall 420d. The first sidewall 420a makes contact with the lamp unit 300. The second sidewall 420b is parallel to the first sidewall 420a. The third sidewall 420c connects a first end portion of the first sidewall 420a and a first end portion of the second sidewall 420b. The fourth sidewall 420d connects a second end portion of the first sidewall 420a and a second end portion of the second sidewall 420b, and the fourth sidewall 420d is parallel to the third sidewall 420c. Two end portions of the lamp 310 make contact with the third and fourth sidewalls 420c and 420d, respectively.

The third and fourth sidewalls 420c and 420d include LGP fixing members 425, respectively. Each of the LGP fixing members 425 has a thickness t3. The LGP fixing members 425 protrude from the third and fourth sidewalls 420c and 420d such that the LGP fixing members 425 extend parallel to the first and second sidewalls 420a and 420b.

The second receiving container 450 includes a second base plate 451 and a second frame portion protruding from edge portions of the second base plate 451. The second receiving container 450 receives the light guide plate 100 and the lamp unit 300. The second frame portion includes a fifth sidewall 452a, a sixth sidewall 452b, a seventh sidewall 452c and an eighth sidewall 452d. The fifth sidewall 452a corresponds to the first sidewall 420a of the first receiving container 400. The sixth sidewall 452b corresponds to the second sidewall 420b of the first receiving container 400. The seventh sidewall 452c corresponds to the third sidewall 420c of the first receiving container 400, and the eighth sidewall 452d corresponds to the fourth sidewall 420d of the first receiving container 400.

The second receiving container 450 includes slits 455. The LGP fixing members 425 of the first receiving container 400 are inserted into the slits 455 when the two receiving containers 400, 450 are combined. When the first receiving container 400 receives the light guide plate 100 and the lamp unit 300, two end portions of the first face 111 of the light guide plate 100 make contact with the LGP fixing members 425, respectively.

The buffer portion 330 of the lamp holder 320 has a thickness of t1 that is smaller than the third width t3 of the LGP fixing member 425, so that the first face 111 of the light guide plate 100 is spaced apart from the buffer portion 330 by a distance d.

Therefore, when impact is applied to the backlight assembly, the LGP fixing members 425 prevent the floating of the light guide plate 100. Furthermore, the buffer portion 330 absorbs the impact. Additionally, the buffer opening 335 absorbs the impact.

According to the present embodiment, the second receiving container 450 includes, for example, metal in order to dissipate heat and block electromagnetic interference. Where it is desirable to reduce the device weight and thickness, the second receiving container 450 may be omitted from the backlight assembly.

Figure 10:
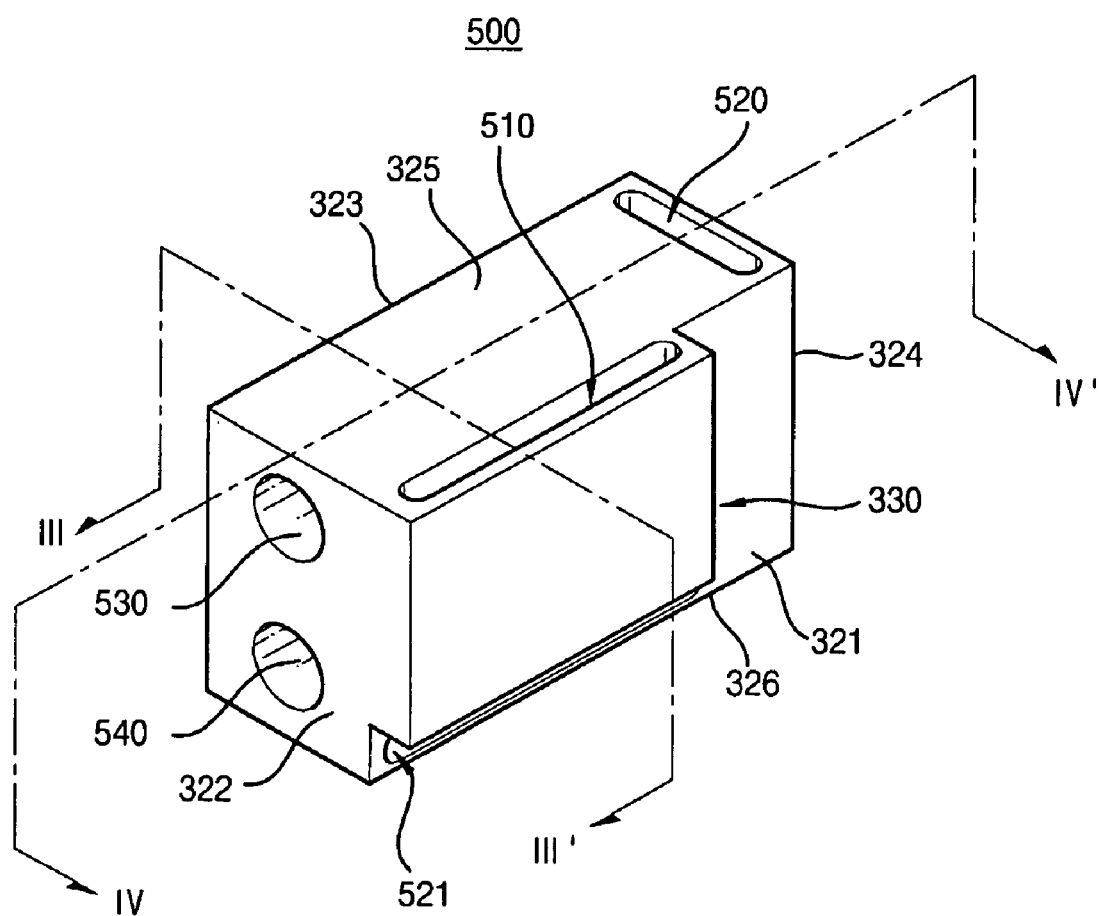
FIG. 10 is a perspective view illustrating a lamp holder according to a third exemplary embodiment of the present invention.
Figure 11:
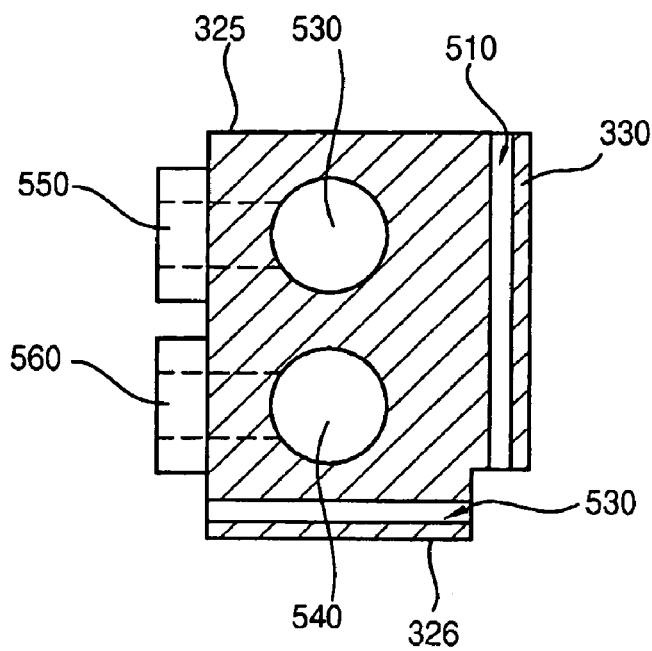
FIG. 11 is a cross-sectional view taken along a line III-III' in FIG. 10.

FIG. 10 is a perspective view illustrating a lamp holder according to a third exemplary embodiment of the present invention. FIG. 11 is a cross-sectional view taken along a line III-III' in FIG. 10, and FIG. 12 is a cross-sectional view taken along a line IV-IV' in FIG. 10.

The same reference numerals will be used to refer to the same or like parts as those described in FIG. 2, and any further explanation concerning the above elements will be omitted.

Figure 12:
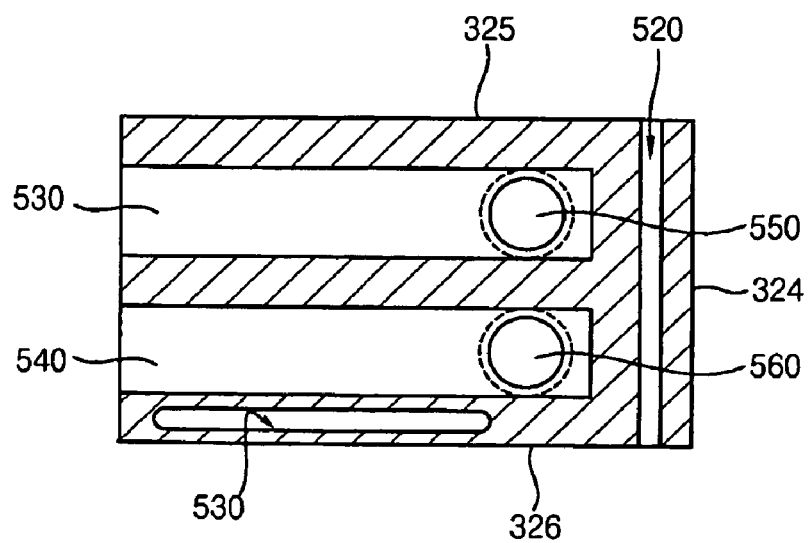
FIG. 12 is a cross-sectional view taken along a line IV-IV' in FIG. 10.

Referring to FIGS. 10 to 12, the lamp holder 500 includes a first buffer opening 510, a second buffer opening 520 and a third buffer opening 521. The first buffer opening 510 is formed at the buffer portion 330. The first buffer opening 510 is substantially same as the buffer opening 335 in FIG. 2.

The second buffer opening 520 is adjacent to the fourth face 324. The second buffer opening 520 extends between the first face 321 and the third face 323.

The fourth face 324 makes contact with the third sidewall 240 of the receiving container 200, and the sixth face 326 makes contact with the base plate 210 of the receiving container 200. Therefore, the second buffer opening 520 absorbs any impact applied to the third sidewall 240 of the receiving container 200, and the third buffer opening 530 absorbs any impact applied to the base plate 210 of the receiving container 200.

The lamp holder 500 according to the present embodiment may further include a second buffer portion and a third buffer portion protruding from the fourth face 324 and the sixth face 326, respectively, and the second buffer opening 520 and the third buffer opening 521 may be formed on the second and third buffer portions, respectively.

Figure 13:
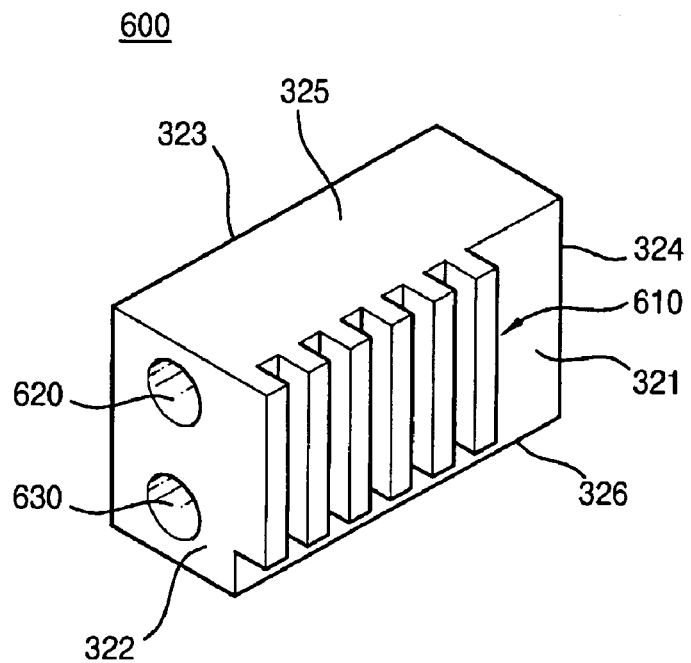
FIG. 13 is a perspective view illustrating a lamp holder according to a fourth exemplary embodiment of the present invention.

FIG. 13 is a perspective view illustrating a lamp holder according to a fourth exemplary embodiment of the present invention.

The lamp holder as shown in FIG. 13 is substantially the same as the lamp holder in FIG. 2, except for a buffer portion 610. Thus, the same reference numerals will be used to refer to the same or like parts as those described in FIG. 2, and any further explanation concerning the above elements will be omitted.

Referring to FIG. 13, the lamp holder 600 includes a body having a rectangular parallelpiped shape and a buffer portion 610. The body has a first face 321, a second face 322, a third face 323, a fourth face 324, a fifth face 325 and a sixth face 326. The buffer portion 610 includes a plurality of protrusions protruding from the first face 321 by a thickness t1. The protrusions are spaced apart from each other. Each of the protrusions has a linear shape.

The buffer portion 610 absorbs any impact applied to the lamp holder 600 like a spring. Therefore, damages caused by the floating of the light guide plate 100 or impacts applied to the light guide plate are reduced or prevented.

Figure 14:
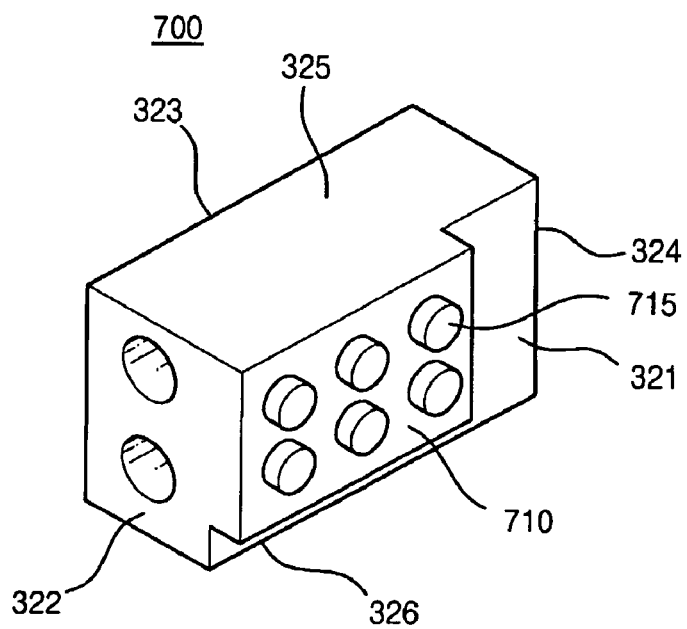
FIG. 14 is a perspective view illustrating a lamp holder according to a fifth exemplary embodiment of the present invention.

FIG. 14 is a perspective view illustrating a lamp holder according to a fifth exemplary embodiment of the present invention.

The lamp holder as shown in FIG. 14 is substantially the same as the lamp holder as shown in FIG. 2, except a buffer portion 610. Thus, the same reference numerals will be used to refer to the same or like parts as those described in FIG. 2, and any further explanation concerning the already-described elements will be omitted.

Referring to FIG. 14, a lamp holder 700 according to the fifth exemplary embodiment includes a buffer portion 710 formed at the first face 321. The buffer portion 710 includes a plurality of protrusions 715. The protrusions 715 are spaced apart from each other and protrude from the first face 321. Each of the protrusions 715 has, for example, a cylindrical shape. However, the shape of the protrusions is not a limitation of the invention and each of the protrusions 715 may have any shape such as a truncated cone shape, truncated pyramid shape, etc.

The protrusions 715 of the buffer portion 710 absorb the impact applied by the lamp holder 700 like a spring. Therefore, damages caused by floating of the light guide plate 100 or impacts applied to the light guide plate 100 are reduced or prevented.

Figure 15:
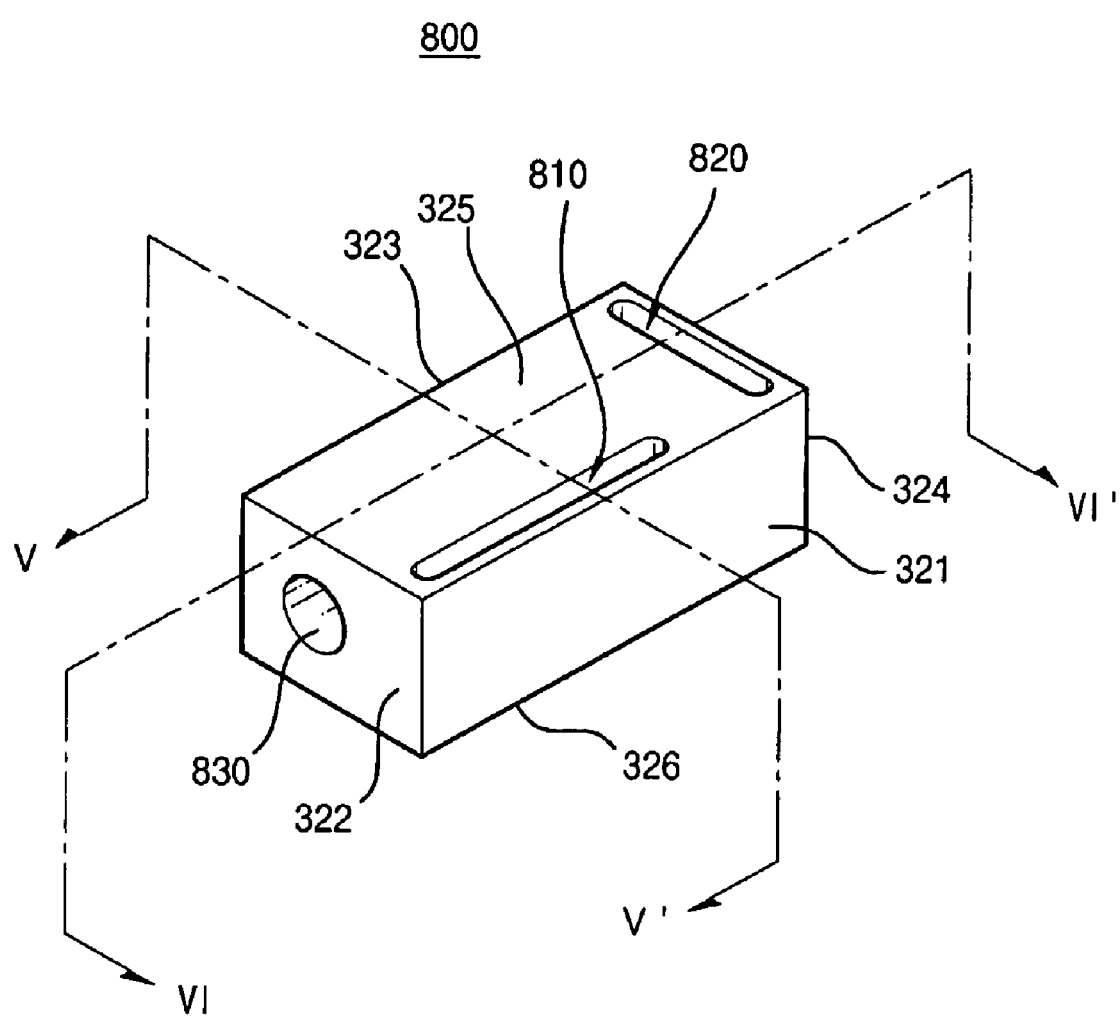
FIG. 15 is a perspective view illustrating a lamp holder according to a sixth exemplary embodiment of the present invention.
Figure 16:
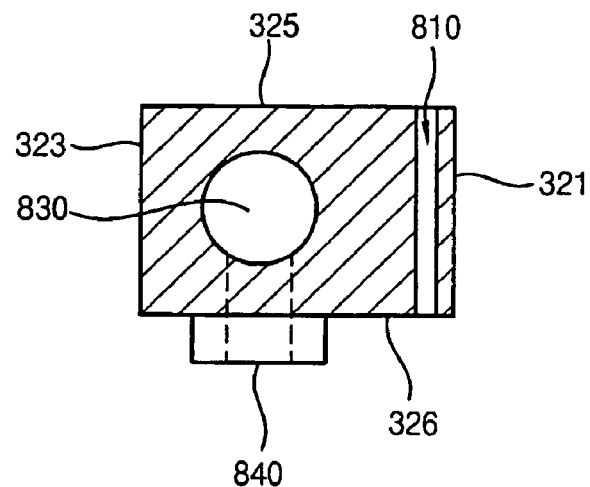
FIG. 16 is a cross-sectional view taken along a line V-V' in FIG. 15.

FIG. 15 is a perspective view illustrating a lamp holder according to a sixth exemplary embodiment of the present invention. FIG. 16 is a cross-sectional view taken along a line V-V' in FIG. 15, and FIG. 17 is a cross-sectional view taken along a line VI-VI' in FIG. 15.

The same reference numerals will be used to refer to the same or like parts as those described in FIG. 2, and any further explanation concerning the above elements will be omitted.

Figure 17:
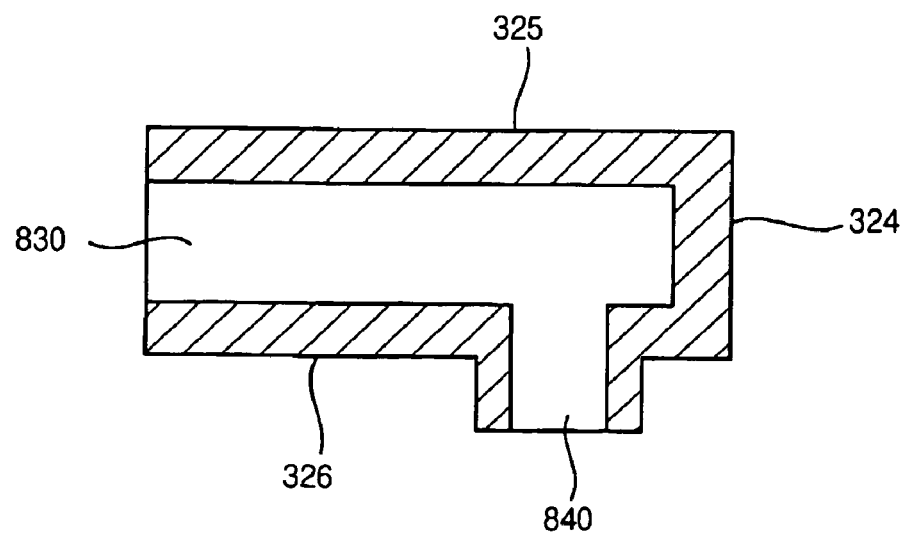
FIG. 17 is a cross-sectional view taken along a line VI-VI' in FIG. 15.

Referring to FIGS. 15 to 17, a lamp holder 800 according to the sixth exemplary embodiment includes a first buffer opening 810 and a second buffer opening 820. The first buffer opening 810 and second buffer opening 820 penetrate between the fifth face 325 and the sixth face 326. The first buffer opening 810 is adjacent to the first face 321, and the second buffer opening 820 is adjacent to the fourth face 324.

The lamp holder 800 further includes a first hole 830 and a second hole 840. The first hole 830 is formed on the second face 322. The first hole 830 receives a lamp (not shown). The second hole 840 is formed on the sixth face 326. The second hole 840 receives wires (not shown) for driving the lamp.

The first buffer opening 810 absorbs the impact applied to the first side face of the light guide plate (not shown), and the second buffer opening 820 absorbs the impact applied to the receiving container 200.

Figure 18:
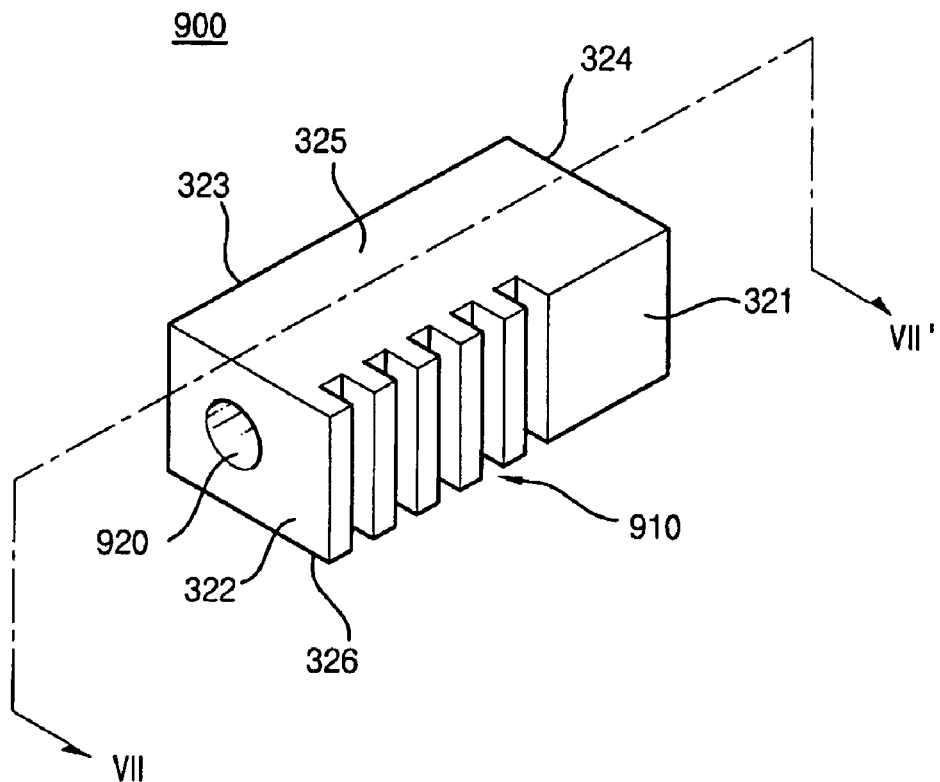
FIG. 18 is a perspective view illustrating a lamp holder according to a seventh exemplary embodiment of the present invention.
Figure 19:
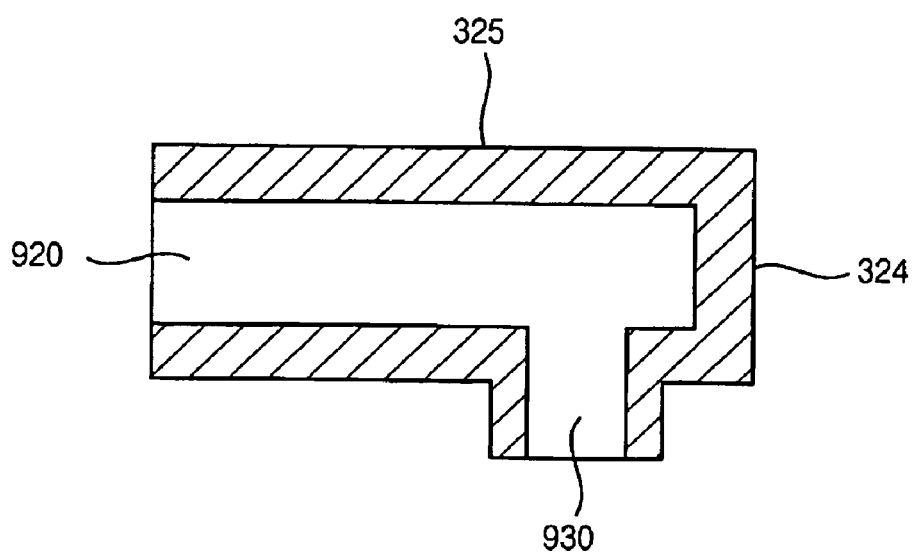
FIG. 19 is a cross-sectional view taken along a line VII-VII' in FIG. 18.

FIG. 18 is a perspective view illustrating a lamp holder 900 according to a seventh exemplary embodiment of the present invention, and FIG. 19 is a cross-sectional view taken along a line VII-VII' in FIG. 18.

The lamp holder 900 as shown in FIGS. 18 and 19 is substantially the same as the lamp holder as shown in FIG. 13 except for the number of holes for receiving the lamp and the number and position of wire holes. Thus, the same reference numerals will be used to refer to the same or like parts as those described in FIG. 13, and any further explanation concerning the already-described elements will be omitted.

Referring to FIGS. 18 and 19, the lamp holder 900 includes a buffer portion 910 formed at a first face 321 of the lamp holder 900. The buffer portion 910 includes a plurality of grooves spaced apart from each other. The grooves have a rectangular shape. In other words, rectangular portions of the first face 321 are removed to form the buffer portion 910. The removed rectangular portions may be spaced apart from each other at a regular interval.

The lamp holder 900 further includes a first hole 920 for receiving a lamp (not shown) and a second hole 930 for receiving the wires that apply the driving voltage to the lamp.

FIG. 20 is an exploded perspective view illustrating a display apparatus according to an exemplary embodiment of the present invention.

Referring to FIG. 20, a display apparatus according to the present embodiment includes a backlight assembly 1000 and a display panel 1100. The backlight assembly 1000 is substantially same as that of FIG. 1. Thus, the same reference numerals will be used to refer to the same or like parts as those described in FIG. 1, and any further explanation concerning the already-explained elements will be omitted.

The display panel 1100 includes a thin film transistor (TFT) substrate 1110, a color filter substrate 1120, and a liquid crystal layer (not shown). The TFT substrate 1110 and the color filter substrate 1120 are substantially parallel to each other, and the liquid crystal layer is disposed between the TFT substrate 1110 and the color filter substrate 1120. When electric fields are applied to the liquid crystal layer, the arrangement of liquid crystal molecules in the liquid crystal layer is altered to change the optical transmittance. This way, the display panel 1100 converts the light provided by the backlight assembly 1000 into an image.

The display apparatus may further include a top chassis (not shown) that is designed to fit with a receiving container 200. The top chassis surrounds the edge portions of the display panel 1100 disposed on the backlight assembly 1000 to prevent the display panel 1100 from being separated from the backlight assembly 1000. The top chassis also protects the display panel 1100 from being damaged by an external impact.

According to the backlight assembly and the display apparatus of the present invention, when impact is applied to thereto, the LGP fixing member 211 on the receiving container 200 and the buffer portion 330 on the lamp holder 320 absorb the impact to prevent the light guide plate 100 from floating toward the lamp unit 300.

Additionally, the buffer opening further absorbs the impact.

According to the present invention, the LGP fixing member protrudes from the base plate of the receiving container and a portion of the lamp holder protrudes toward the light guide plate to form the buffer portion.

Therefore, the LGP fixing member prevents the light guide plate from floating, and the buffer portion absorbs the impact caused by any unprevented floating of the light guide plate. Furthermore, the buffer opening further absorbs the impact to relieve the damages. The overall effect of using the lamp holder of the invention is a significant reduction in the damages to the lamp unit and the light guide plate, and the resultant reliability enhancement for the device.

Having described the exemplary embodiments of the present invention and its advantages, it is noted that various changes, substitutions and alterations can be made herein without departing from the spirit and scope of the invention as defined by appended claims.

What is claimed is:

1. A backlight assembly comprising:
   a lamp generating light;
   a light guide plate having a light incident face through which the light generated by the lamp enters the light guide plate, the light guide plate guiding the light;
   a receiving container having a base plate and sidewalls protruding from edge portions of the base plate to define a receiving space for receiving the lamp and the light guide plate; and
   a lamp holder holding an end portion of the lamp and having a first face facing the light guide plate, the first face having a first portion that protrudes to form a buffer portion that contacts the light guide plate and a second portion that is spaced apart from the light guide plate.

2. The backlight assembly of claim 1, wherein the buffer portion extends toward the light incident face of the light guide plate.

3. The backlight assembly of claim 2, wherein the receiving container further comprises a light guide plate fixing member protruding from the base plate to be disposed between the light incident face of the light guide plate and the second portion of the first face of the lamp holder.

4. The backlight assembly of claim 2, wherein the receiving container further comprises a light guide plate fixing member protruding from the sidewalls toward the receiving space.

5. The backlight assembly of claim 4, wherein the receiving container comprises:
   a first receiving container having the light guide plate fixing member; and
   a second receiving container received by the first receiving container, the second receiving container having slits such that the light guide plate fixing member is inserted into the slits.

6. The backlight assembly of claim 2, wherein the buffer portion is spaced apart from the light incident face of the light guide plate by a predetermined distance.

7. The backlight assembly of claim 6, wherein the predetermined distance is in a range of about 0.05 mm to about 0.1 mm.

8. The backlight assembly of claim 1, wherein the lamp holder further comprises a first buffer opening for absorbing impact applied to the light guide plate and the receiving container.

9. A backlight assembly comprising:
   a lamp generating light;
   a light guide plate having a light incident face through which the light generated by the lamp enters the light guide plate, the light guide plate guiding the light;

a receiving container having a base plate and sidewalls protruding from edge portions of the base plate to define a receiving space for receiving the lamp and the light guide plate; and a lamp holder holding an end portion of the lamp, the lamp holder including a first buffer opening for absorbing impact applied to the light guide plate and the receiving container, wherein the first buffer opening is a hole extending in a direction that is substantially perpendicular to the base plate of the receiving container.

10. The backlight assembly of claim 8, wherein the first buffer opening is formed at the buffer portion.

11. The backlight assembly of claim 9, wherein the lamp holder further comprises a second buffer opening adjacent to the sidewalls of the receiving container.

12. The backlight assembly of claim 8, wherein the lamp holder further comprises a second buffer opening that is adjacent to the sidewalls of the receiving container and formed in a direction that is substantially perpendicular to the base plate of the receiving container, and a third buffer opening formed in a direction that is substantially parallel to the base plate of the receiving container.

13. A backlight assembly comprising:

a lamp generating light;

a light guide plate having a light incident face through which the light generated by the lamp enters the light guide plate, the light guide plate guiding the light;

a receiving container having a base plate and sidewalls protruding from edge portions of the base plate to define a receiving space for receiving the lamp and the light guide plate; and a lamp holder holding an end portion of the lamp, the lamp holder including a buffer portion, wherein at least a portion of the lamp holder that is adjacent to the light incident face of the light guide plate protrudes toward the light incident face of the light guide plate to form the buffer portion, wherein the buffer portion comprises at least one protrusion protruding from the buffer portion toward the light incident face of the light guide plate.

14. The backlight assembly of claim 13, wherein the buffer portion comprises multiple protrusions including the at least one protrusion, and wherein each of the protrusions has a cylindrical shape, and the protrusions are spaced apart from each other.

15. The backlight assembly of claim 13, wherein the buffer portion comprises multiple protrusions including the at least one protrusion, and wherein each of the protrusions has a linear shape, and the protrusions are spaced apart from each other.

16. A backlight assembly comprising:

a lamp generating light;

a light guide plate having a light incident face through which the light generated by the lamp enters the light guide plate, the light guide plate guiding the light;

a receiving container having a base plate and sidewalls protruding from edge portions of the base plate to define a receiving space for receiving the lamp and the light guide plate; and a lamp holder holding an end portion of the lamp, the lamp holder including a plurality of grooves formed on a first face of the lamp holder for absorbing impact applied to the light guide plate and the receiving container, each of the grooves having a rectangular shape and spaced apart from each other.

17. A display apparatus comprising:

a backlight assembly including:

a lamp generating light;

a light guide plate having a light incident face through which the light generated by the lamp enters the light guide plate, the light guide plate guiding the light;

a receiving container having a base plate and sidewalls protruding from edge portions of the base plate to define a receiving space for receiving the lamp and the light guide plate; and a lamp holder holding an end portion of the lamp and having a first face facing the light guide plate, the first face having a first portion that protrudes to form a buffer portion that contacts the light guide plate and a second portion that is spaced apart from the light guide plate; and a display panel disposed over the backlight assembly, the display panel converting the light generated by the lamp of the backlight assembly into an image.

18. The display apparatus of claim 17, wherein the receiving container further comprises a light guide plate fixing member protruding from the base plate to be disposed between the light incident face of the light guide plate and the buffer portion of the lamp holder.

19. The display apparatus of claim 17, wherein the lamp holder further comprises a buffer opening for absorbing an impact applied to the light guide plate and the receiving container.

20. A display apparatus comprising:

a backlight assembly including:

a lamp generating light;

a light guide plate having a light incident face through which the light generated by the lamp enters the light guide plate, the light guide plate guiding the light;

a receiving container having a base plate and sidewalls protruding from edge portions of the base plate to define a receiving space for receiving the lamp and the light guide plate; and a lamp holder holding an end portion of the lamp, the lamp holder including a buffer opening for absorbing an impact applied to the light guide plate and the receiving container, wherein the buffer opening is a hole extending in a direction that is substantially perpendicular to the base plate of the receiving container; and a display panel disposed over the backlight assembly, the display panel converting the light generated by the lamp of the backlight assembly into an image.

* * * * *